Jan. 18, 1966  I. SOYLAND ETAL  3,229,466
ARRANGEMENT IN HYDRAULIC PRESSURE SYSTEMS
Filed June 29, 1964
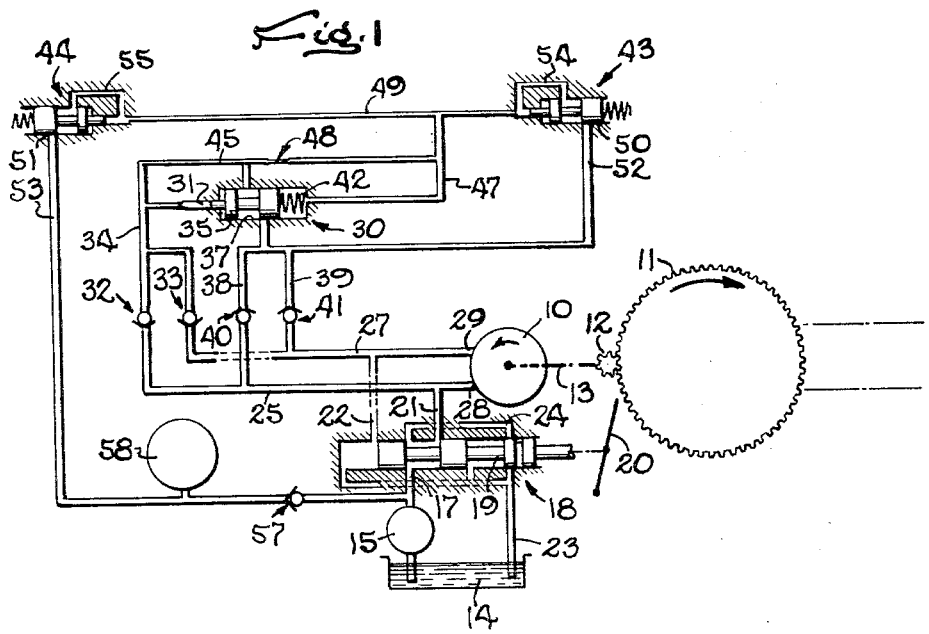
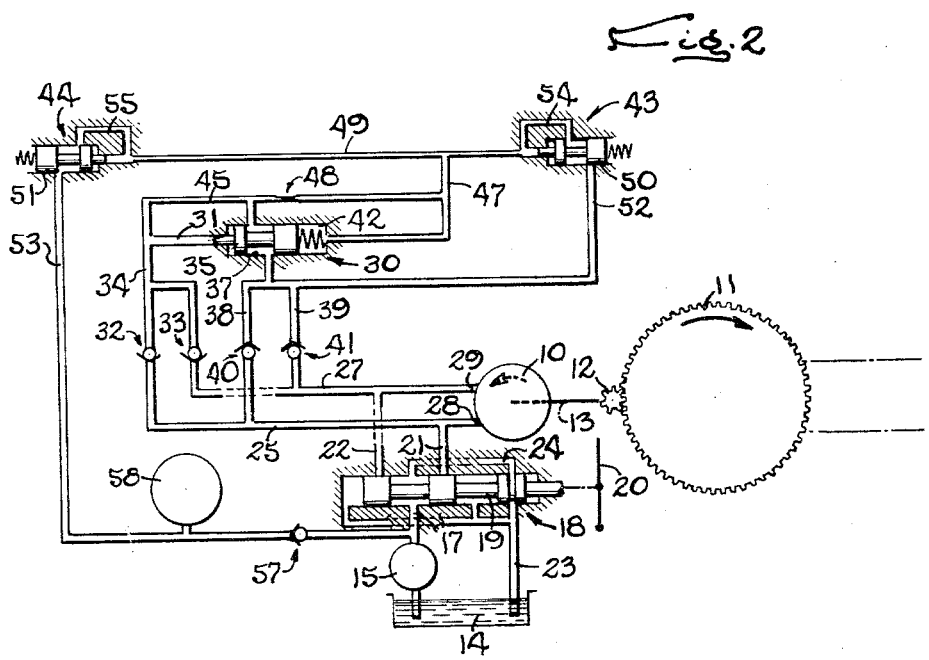
INVENTORS
Ingebret Soyland
Kristian Soyland
by Wolfe, Hubbard, Voit & Osann
ATTORNEYS United States Patent Office 3,229,466
Patented Jan. 18, 1966

3,229,466
ARRANGEMENT IN HYDRAULIC PRESSURE
SYSTEMS
Ingebret Soyland and Kristian Soyland, both of Box 130,
Bryne, near Stavanger, Norway
Filed June 29, 1964, Ser. No. 378,740
Claims priority, application Norway, July 5, 1963,
149,285
7 Claims. (Cl. 60—53)

This invention relates to hydraulic pressure systems adapted for use in heavy duty machines such as excavators, cranes, and the like in which heavy bodies are moved back and forth. An example is the system for controlling the back and forth rotation of the upper body of an excavator about a vertical axis during an excavating operation.

In such systems, a reversible rotary hydraulic motor is suitably connected, for example, by a turning gear, to the body, and is driven by fluid under pressure from a pump. A safety valve is provided in the system to limit the maximum working pressure in the system and thus insure that the force applied to the turning gear does not exceed safe limits which may be selected by adjusting the opening point of the safety valve. The maximum working pressure is selected with the efficiency loss in the motor and the drive connection in mind to obtain optimum working power without danger of damage to the mechanism. During working, the power available at the turning gear is reduced by the power loss in the drive.

When the motor is deactivated with the upper body turning in one direction, the inertia of the body then drives the turning gear and the motor which thus acts as a pump and continues to force fluid through the system until the motion is braked. In this instance, however, the load on the turning gear is equal to the pressure load in the system plus the efficiency loss since the latter occurs between the driven gear and the system. In other words, the load on the gear during braking of the machine will be substantially greater than the maximum load during working, if the braking pressure in the system remains the same as the working pressure. Thus, in order to accommodate the adverse effect of efficiency losses on braking forces, it has been necessary to either reduce the maximum working pressure level or provide a second pressure control that is activated during braking and is operable to relieve the system at a pressure level lower than the working pressure level. Of course, the second pressure control is preferred where high working pressures are required.

The primary object of the present invention is to provide an improved and simplified hydraulic system in which a single safety valve determines both the relatively high working pressure and the relatively low braking pressure automatically in response to activation and deactivation of the motor.

Other objects and advantages of the invention will become apparent from the following detailed description taken in connection with the accompanying drawings, in which FIGURE 1 is a schematic view of a hydraulic system embodying the novel features of the present invention.

FIG. 2 is a schematic view similar to FIG. 1 and showing a different condition of the system.

As shown in the drawings for purposes of illustration, the invention is embodied in a hydraulic system including a rotary hydraulic motor 10 for rotating a body (not shown) through meshing gears 11 and 12 respectively mounted on the excavator body and the motor shaft 13. Pressure fluid is drawn from a sump 14 by a suitable pump 15 whose intake communicates with the sump and whose output is delivered to a hydraulic line 17 communicating with a control valve 18. Herein, the latter is a four-way valve having a spool 19 manually positioned by a hand lever 20.

In the neutral position of the spool 19 (FIG. 2), its lands close the two outlet lines 21 and 22 of the valve 18 and establish communication between the pump output line 17 and a return line 23 through a branch line 24 so that the pump output flows back to the sump 14 and the pump 15 idles. When the spool is shifted to the right or to the left from this neutral position, the pump output is delivered to one or the other of the outlet lines 21, 22 and thus to one of the main lines 25 and 27 communicating with the two pressure ports 28 and 29 of the motor 10 to operate the motor in the desired direction, counterclockwise when the spool is shifted to the right (FIG. 1) and clockwise when the spool is shifted to the left.

With the valve spool 19 positioned as shown in FIG. 1 for counterclockwise rotation of the motor 10, fluid from the pump 15 flows through the control valve 18 into the line 21 and then into line 25 leading to the intake port 28 of the motor. After flowing through the motor and the exhaust port 29, the fluid is returned to the sump 14 through lines 27 and 22, the control valve and the return line 23. When the valve spool is in its left-hand position (not shown), the flow is from the control valve through lines 22 and 27 to port 29 of the motor, through the motor to its exhaust port 28 and line 25, and then back to the sump through lines 21 and 23.

To limit the working pressure that may be developed in the system in both directions of motor operation, a safety or relief valve 30 is provided with an inlet connection 31 communicating with both main lines 25 and 27 beyond two check valves 32 and 33 therein, the check valves being arranged to permit a flow of fluid through each line away from the motor but to block flow through the lines toward the motor. Between the check valves and the safety valve, the main lines are connected to a single line 34 leading to the safety valve inlet line 31.

Herein, the safety valve 30 is of the type including a plunger 35 slidable back and forth in a bore 37 and spring-urged toward the left end of the bore into a closed position in which the plunger closes an outlet opening communicating with two drain lines 38 and 39 connected to the main lines 25 and 27 through check valves 40 and 41 which permit a flow of fluid from the safety valve outlet to the main lines but not in the opposite direction.

With the foregoing arrangement, pressure fluid from the high pressure main line 25 or 27 depending upon the direction of motor activation, passes through the associated check valve 32 or 33 to the safety valve inlet line 31 and acts on the left end of the plunger 35 in a direction to open the valve. In the condition shown in FIG. 1, the line 25 is the high pressure line and the line 27 is the exhaust line. The high pressure fluid holds the check valve 33 closed in the exhaust line so that exhaust fluid from the motor is returned to the sump 14. If the pressure of the fluid being delivered to the motor exceeds the value for which the safety valve 30 is set to open, the plunger 35 is moved to the right to uncover the outlet opening, and the pressure is relieved through check valve 41 and line 39 communicating with the exhaust line 27. Of course, the other drain line 38 then is connected to the high pressure line 25 so that the check valve 40 is held closed. In the opposite direction of motor operation, high pressure fluid acts on the safety valve plunger 35 through line 27 and is relieved through lines 40 and 25 when the safety valve opens. Thus, the safety valve controls the maximum pressure in the system in both directions of motor activation.

When the excavator body is in motion and the control valve 18 is shifted into its neutral position, the inertia of the body then drives the motor 10 which acts as a pump and forces fluid through its exhaust port into the main line 25, 27 which had been the exhaust line when the motor was being driven by the pump 15. Thus, this line immediately becomes the high pressure line and fluid is drawn from the other line into the motor. Since the inlet 31 of the safety valve is connected to both main lines and only the pressure-operated check valves 32 and 33 control the direction of flow in these lines, the safety valve 30 is switched immediately into communication with the motor outlet line to control the pressure resulting from pumping of fluid by the motor.

In accordance with the present invention, novel and simple means are provided in the system for reducing the maximum pressure in the system automatically in response to deactivation of the motor 10 thereby to counteract the adverse effect of efficiency losses during braking of the moving body. For this purpose, opening of the safety valve 30 is resisted by a preselected force derived from pressure fluid delivered to a pressure chamber 42 behing the plunger 35, such pressure fluid herein being referred to as "pilot fluid." The pressure of this pilot fluid is controlled by two relief valves 43 and 44 having preselected and different opening points. The valve 44 is set to open at the lower pressure and is disabled whenever the motor 10 is activated in either direction so that the valve 43 having the higher setting controls the pilot pressure level when the motor is activated.

When the motor is deactivated, the low pressure pilot valve 44 becomes operable, overrides the high pressure pilot valve 43, and relieves the pressure in the pilot system at a level substantially lower than the working pilot pressure maintained by the high pressure pilot valve. Accordingly, a single safety valve, the loading of which is controlled by two simple pilot valves, is effective to adjust the maximum pressure of the system automatically in response to activation and deactivation of the motor.

As shown in the drawings, pilot pressure is applied to the chamber 42 through a pilot line 45 communicating between the high pressure line 34 and a branch line 47 leading to the pressure chamber with a restriction 48 forming a choke interposed between the high pressure line and the pressure chamber. The branch line 47 also leads to another pilot line 49 with which the inlets of the two pilot valves 43 and 44 communicate thereby to control the pilot pressure in line 47 and behind the safety valve plunger 35.

While it will be apparent that the pilot valves may take various forms, herein they are shown schematically as including spring-loaded plungers 50, 51 normally held in the positions shown in FIG. 1 closing their respective drain lines 52, 53 but movable in response to pressure increases in the pilot line 49 into open positions in which pilot fluid may drain from the pilot line through a passage 54, 55 into the associated drain line. The drain line 52 of the high pressure valve 43 communicates with the drain lines 38, 39 of the safety valve 30 while the drain line 53 of the low pressure valve 44 leads to the pump output line 17 through a check valve 57, which, when open, permits fluid to flow from the drain line to the pump line.

Interposed between the check valve 57 and the low pressure pilot valve 44 is an accumulator 58 of well known construction which is charged through the low pressure valve when the latter is open and the motor 10 is activated so that high pressure fluid in the pump line 17 holds the check valve 57 closed. After the accumulator has been charged, no further flow through the low pressure valve is possible so long as a high pressure exists in the pump line 17. When the pressure in the drain line 53 exceeds the pressure in the pump line, however, the check valve opens to permit the accumulator to discharge or additional fluid to drain through the low pressure valve.

With the foregoing arrangement, shifting of the operating valve spool 19 to one of its active positions begins operation of the motor 10 in the selected direction. Assuming for purposes of illustration that the spool is shifted to the right to the position shown in FIG. 1, the pump output is directed into main line 25 and thus through the motor in a direction to drive the latter counterclockwise with the motor exhausting into main line 27. The high pressure fluid in the input line opens check valve 32 and then holds check valve 33 closed in the exhaust line so that the exhaust fluid is returned to the sump 14 through lines 22 and 23.

Pressure rapidly builds up in the input line 25 and also in the intake line 31 of the safety valve 30. At the same time, through pilot lines 45, 47 and 49, the pilot pressure builds up behind the safety valve plunger 35 and in front of the two pilot valves 43 and 44. Since the low pressure valve has a substantially lower opening point than the high pressure valve, the former opens (see FIG. 2) and permits liquid to flow into the drain line 53. At this point, the check valve 57 is held closed by the high pressure fluid in the pump line 17 so the lower pressure fluid flowing through the low pressure valve 44 charges the accumulator 58 and the pressure in the accumulator, the drain line 53, and the pilot lines continues to build up and approach the level for which the high pressure pilot valve 43 is set to open.

When this pressure level is reached, the pilot valve 43 takes over control of the pilot pressure and the loading of the safety valve plunger 35, opening to prevent the pilot pressure from exceeding the selected value for the loading of the safety valve 30. At this point, the low pressure pilot valve is open but its drain line remains closed to deactivate or disable the valve. Thus, pilot fluid drains through the pilot valve 43 and line 52 communicating with the motor exhaust line 27 and is returned to the sump 14 with the exhaust fluid. If for any reason, the working pressure tends to exceed the selected maximum, the safety valve 30 opens to relieve the pressure by draining fluid from the main line 25 into the exhaust line 27.

If the control valve 18 now is returned to its neutral position (FIG. 2) with the driven body turning in one direction, the pump output is by-passed around the motor 10 and given a free flow back to the sump 14 through line 24 while the moving body continues to drive the motor in the same direction as indicated by the arrows in FIG. 2. Thus, the line 27 becomes the high pressure line, as compared to line 25, and fluid is pumped through check valve 33 into the line 34 leading to the safety valve inlet line 31. At the same time, the pressure in the pump line 17 decreases and the check valve 57 is free to open. Thus, the low pressure pilot valve 44 immediately is activated to relieve the pilot pressure in the pilot lines 49 and 47 and behind the safety valve plunger 35, and the safety valve opening point is correspondingly lowered. As a result of this, the safety valve opens to reduce the braking pressure in the system to a level substantially below the working pressure level to prevent a sharp increase in the loading of the drive gearing during braking.

It will be seen that the same action takes place regardless of the direction of motion of the motor 10 when the control valve 18 is shifted into the neutral position. Moreover, if the valve should be shifted directly from one active position into the other without stopping in the neutral position, the accumulator 58 discharges at a relatively rapid rate through the check valve 57 as the control valve spool 19 passes through the neutral position, and then is recharged at a much slower rate through the low pressure pilot valve 44 and the restriction 48 in the pilot line 45. Thus, the low pressure valve controls the loading of the safety valve 30 and softens the braking action and the shock of the direction change as the accumulator 58 is being recharged.

I claim as my invention:

1. In a hydraulic system, the combination of, a sump; a pump having an outlet and an intake communicating with said sump; a reversible motor having first and second pressure ports; a control valve selectively operable to connect said pump outlet to said first port, to said second port, and to said sump thereby to activate said motor in opposite directions and deactivate the motor; a first hydraulic line communicating with said pump outlet when said motor is activated in either direction and with the exhaust port when the motor is deactivated; a safety valve having an inlet connection at its front end connected to said first line, an outlet communicating with said sump, and a plunger movable back and forth to open and close said outlet; means for applying a selected closing force to said plunger including a second hydraulic line having a restriction therein and communicating between said first line and the rear end of said valve to apply a force on said plunger resisting opening of the valve; a first pilot valve having an inlet communicating with said second line and a drain opening communicating with said sump; a drain line connected to said pump outlet; a second pilot valve having an inlet communicating with said second line and with the inlet of said first pilot valve, and a drain opening communicating with said drain line; said first pilot valve having a preselected opening point substantially higher than the opening point of said second pilot valve; and a check valve interposed in said drain line between said second pilot valve and said pump outlet and arranged to be held closed by pressure fluid from said pump when said motor is activated whereby said drain line is blocked and said second pilot valve is disabled when the motor is activated and the drain line is opened and the second pilot valve becomes operable when the motor is deactivated.

2. The combination defined in claim 1 further including an accumulator communicating with said drain line between said second pilot valve and said check valve to be charged through the second pilot valve when the motor is activated and to discharge through the check valve when the motor is deactivated.

3. In a hydraulic system, the combination of, a source of fluid, a pump communicating with said source to draw fluid therefrom, a reversible motor having first and second pressure ports, control means interposed between said pump and said motor and selectively operable to establish communication between said pump and alternate ones of said ports to activate said motor, and also operable to break such communication to deactivate the motor, a pressure-operated and pilot-pressure loaded safety valve in said system having an inlet connection communicating with said pump during motor activation to control the maximum pressure of fluid delivered to said motor, and communicating with the exhaust port of the motor when the latter is deactivated to control the maximum pressure at said exhaust port, a first pilot valve for maintaining a first relatively high pilot pressure resisting opening of said safety valve, a second pilot valve operable when activated to substantially reduce the pressure resisting opening of said safety valve, said pilot valves being arranged in communication with each other whereby activation of said second valve overrides said first valve, said second valve having a drain line communicating with the outlet of said pump, and a valve in said drain line operated by pressure fluid from said pump and operable to block flow through said drain line when said motor is activated and to permit a flow from said second valve through said drain line when said motor is deactivated thereby to activate said second valve to reduce the pressure-loading of said safety valve whereby the maximum pressure permitted at the exhaust port when the motor is deactivated is substantially less than the maximum pressure delivered to the motor when it is activated.

4. In a hydraulic system, the combination of, a motor having an inlet and an outlet, a pump for supplying fluid under pressure, control means for selectively connecting and disconnecting said pump and said inlet to activate and deactivate said motor, a safety valve having an inlet connection communicating with said pump when said motor is activated and with said motor outlet when the motor is deactivated and operable to open and limit the maximum pressure in said system in both conditions of said motor, means for resisting opening of said safety valve including a first hydraulic line for applying pressure fluid behind said safety valve to resist opening thereof, first and second pilot valves each having an inlet communicating with said line, a drain line, and a preselected set point for opening to drain said first line and limit the pressure therein and the force resisting opening of said safety valve, said first pilot valve having a higher set point than said second pilot valve, and means operable in response to activation of said motor to disable said second pilot valve whereby said first pilot valve controls said safety valve when the motor is activated and said second pilot valve controls the safety valve when said motor is deactivated.

5. The combination defined in claim 4 in which said disabling means comprises a check valve in the drain line of said second pilot valve arranged to be held closed by pressure fluid from said pump when said motor is activated, and free to open said drain line when the motor is activated.

6. The combination defined in claim 5 further including an accumulator interposed between said check valve and said second pilot valve to be charged through said second pilot valve and to discharge through said check valve when said motor is deactivated.

7. In a hydraulic system, the combination of, a motor having an inlet and an outlet, a pump for supplying fluid under pressure, control means for selectively connecting and disconnecting said pump and said inlet to activate and deactivate said motor, a safety valve having an inlet connection communicating with said pump when said motor is activated and with said motor outlet when the motor is deactivated, said valve including a member movable to an open position in response to the pressure on one side of said member and having a pressure chamber on the other side of said member, means for supplying pilot pressure fluid to said chamber to resist opening of said safety valve, first and second pilot valves each having an inlet communicating with said pressure chamber and a preselected set point for opening to limit the pressure of fluid in said chamber, said first pilot valve having a higher set point than said first pilot valve, and means operable in response to activation of said motor to disable said second pilot valve whereby said first pilot valve controls the opening point of said safety valve when said motor is activated and said second pilot valve controls the opening point of the safety valve when the motor is deactivated.

References Cited by the Examiner

UNITED STATES PATENTS

| | | | |
|---|---|---|---|
| 2,267,177 | 12/1941 | Twyman | 60—52 |
| 2,318,851 | 5/1943 | Griffith | 60—97 X |
| 2,848,874 | 8/1958 | Towler | 60—52 |

SAMUEL LEVINE, *Primary Examiner.*

EDGAR W. GEOGHEGAN, *Examiner.*